United States Patent
Von Bergen et al.

(10) Patent No.: US 7,310,719 B2
(45) Date of Patent: *Dec. 18, 2007

(54) MEMORY MANAGEMENT TILE OPTIMIZATION

(75) Inventors: Axel Von Bergen, Wiesloch (DE); Volker Sauermann, Heidelberg (DE); Arne Schwarz, Heidelberg (DE)

(73) Assignee: Sap Aktiengesellschaft, Walldorf (DE)

( * ) Notice: Subject to any disclaimer, the term of this patent is extended or adjusted under 35 U.S.C. 154(b) by 448 days.

This patent is subject to a terminal disclaimer.

(21) Appl. No.: 10/625,908

(22) Filed: Jul. 24, 2003

(65) Prior Publication Data

US 2005/0021924 A1    Jan. 27, 2005

(51) Int. Cl.
*G06F 12/00* (2006.01)
(52) U.S. Cl. ........................ 711/170; 707/205
(58) Field of Classification Search ................ 711/170
See application file for complete search history.

(56) References Cited

U.S. PATENT DOCUMENTS

| | | | |
|---|---|---|---|
| 4,849,905 A | | 7/1989 | Loeb et al. |
| 5,355,473 A | | 10/1994 | Au |
| 5,557,786 A | | 9/1996 | Johnson, Jr. |
| 5,737,732 A | | 4/1998 | Gibson et al. |
| 5,784,699 A | * | 7/1998 | McMahon et al. ........... 711/171 |
| 7,007,149 B2 | * | 2/2006 | Chung ........................ 711/170 |
| 2002/0032676 A1 | | 3/2002 | Wheat et al. |
| 2003/0084266 A1 | * | 5/2003 | Knippel et al. ............. 711/173 |
| 2004/0073763 A1 | * | 4/2004 | Dageville et al. ........... 711/170 |

FOREIGN PATENT DOCUMENTS

| EP | 0 657 830 A | 6/1995 |
|---|---|---|
| WO | WO 02/061612 A | 8/2002 |
| WO | WO 02/061613 A | 8/2002 |

OTHER PUBLICATIONS

Date, C.J., "Introduction to Database Systems, vol. 1," 1990, Addison Wesley, Reading, MA, USA, paragraph '03.6!, figs. 3.17 and 3.18.
Haerder, Theo and Erhard Rahm, "Datenbanksysteme," 1999, Springer, Heidelberg, pp. 207-210, 227-233, figs. 7.15, 8.1 and 8.2.B, English translation provided, 10 pgs.

* cited by examiner

*Primary Examiner*—Brian R. Peugh
*Assistant Examiner*—Matthew Bradley
(74) *Attorney, Agent, or Firm*—Fish & Richardson P.C.

(57) ABSTRACT

A method for allocating memory in a computer system includes allocating a block of memory from an operating system, dividing the block of memory into frames, and dividing each of the frames into instances such that each of the instances is operable to store data. In addition, a software application using application-level memory management includes an application-level memory manager operable to allocate a block of memory to store data elements with the block of memory divided into frames and each frame divided into instances, and application code operable to store data elements in instances of a block of memory allocated by the application-level memory manager.

19 Claims, 12 Drawing Sheets

MEMORY MANAGEMENT TILE OPTIMIZATION

CROSS-REFERENCE TO RELATED APPLICATIONS

This application is related to U.S. application Ser. No. 10/625,897 titled "MEMORY MANAGEMENT FRAME HANDLER" which is being filed concurrently with this application.

TECHNICAL FIELD

This disclosure is directed to a memory management system.

BACKGROUND

Computer systems provide various resources for storing data, such as, for example, random access memory (RAM), read-only memory (ROM), hard disks, tapes, or optical drives. Some or all of a computer system's data storage resources may be provided to the operating system or to software applications. Memory management is the process by which these data storage resources are administered so that a software application may allocate and access those resources. When a software application relinquishes use of data storage resources, memory management may allow those resources to be reused by other software applications.

In a computer system, data storage resources are managed at three different levels: (1) at the hardware level; (2) at the operating system level; and (3) at the application level. At the hardware level, a computer system provides an interface to physical data storage devices that are a part of the computer system or that are coupled to the computer system. For example, hardware memory management may include providing an interface to physical RAM using a cache to improve access speeds. Hardware memory management provides an interface to data storage resources for an operating system.

At the operating system level, memory management exploits data storage resources provided by the hardware level to allow one or more software applications to access those data storage resources. At this level, the computer system may implement various features, such as, for example, virtual memory and data security. Virtual memory allows the computer system to surpass resource limitations of physical RAM using auxiliary data storage (e.g., hard drive). The data security features provided by operating systems allow each application to run independently of one another to prevent errors in one application (or malicious code) from adversely affecting other applications.

At the application level, software applications request memory from the operating system and manage the use of that memory in those software applications. Often, the memory management functions of a software application are provided by the programming environment used to create the application. For example, Java and C++ programming environments each provide an application level memory management system to provide efficient interaction with data storage resources in a wide variety of applications.

SUMMARY

In one general aspect, a method for allocating memory in a computer system includes outputting a request from an application to an operating system for allocation of a block of memory by the operating system to the application, accessing the block of memory at the application, dividing the block of memory into frames, dividing each of the frames into instances, and associating an application-defined instance type with the instances for data storage using the instances. The block of memory may be accessed by the application by allocating a block of memory that begins on a page boundary. The size of the block of memory may be determined by a coding parameter.

In some implementations, dividing the block of memory into frames includes identifying a first page boundary within the block of memory and designating the portion of the block of memory before the first page boundary as unused. The size of each frame may be determined by a coding parameter. The size of each frame may be set to the page size used by the operating system.

Additionally, dividing the block of memory into frames also may include determining a last page boundary within the block of memory and designating a portion of the block of memory after the last page boundary as unused. This method may be implemented by storing a single type of data in the block of memory, such as, for example, data from a fast query system.

In another general aspect, a software application using application-level memory management includes an application-level memory manager operable to allocate a block of memory to store data elements, divide the block of memory into frames, and divide each frame into instances, and application code operable to define data elements as having an instance type, and to associate the instance type with the instances for storage of the data elements in the instances.

In another general aspect, data elements used by an application are associated with an application-defined instance type. The application-determined instance type is associated with an application-determined one of a plurality of blocks of memory allocated by an operating system, wherein the application-determined memory block is divided into frames that are further divided into instances, and the instances are populated with the data elements.

In associating the application-determined instance type with the application-determined block of memory, a single application-determined instance type may be associated with the application-determined block of memory. In populating the application-determined block of memory comprises, the data elements may be removed from the block of memory, and the block of memory may be returned to the operating system. Also, in returning the block of memory to the operating system, the block of memory may be returned to a buffer, and, after a pre-determined period of time, it may be determined that the block of memory is no longer required by the application.

The details of one or more implementations are set forth in the accompanying drawings and the description below. Other features and advantages will be apparent from the description and drawings, and from the claims.

DETAILED DESCRIPTION

The application level memory management functionality provided by programming environments, such as, for example, C, C++, or Java, provide general-purpose support for a wide variety of applications. However, this one-size-fits-all approach cannot provide optimal memory management for all applications.

Some applications allocate large numbers of relatively small objects. For example, one implementation of a fast cache system provides a mechanism to query millions of data records very quickly, by creating complex data structures composed of many small data objects. In one example, a database of 5.3 million records is loaded into a fast cache system. Each record includes 10 attributes and the fast cache system indexes each of the 10 attributes, creating a node for each attribute in each record. Thus, 10 nodes are allocated for each of the 5.3 million data records, resulting in 53 million nodes that must be managed by the memory management system. There is a need for a memory management system that can efficiently allocate and manage large numbers of small objects for such applications.

An application level memory management system may be provided to more efficiently manage large numbers of small data objects by allocating one or more large blocks of data, subdividing each of the large blocks into multiple frames, and subdividing each of the frames to store multiple small data objects. To better describe this memory management technique, it is useful to first describe an application that may benefit from this design: a fast query system.

A data store is a collection of information encoded in a machine-based format, such as, for example, a database, a flat file, a spreadsheet, a file system, or any combination thereof. Applications may be provided to access a data store to search and retrieve the information (i.e., data) contained therein. Many business applications rely on data stores to store, search, and retrieve business data. As computation power increases, data store queries may bottleneck system performance. It is desirable to improve the performance of data store queries.

Information stored in a data store may be freeform, such as a text files, web pages, or articles, or it may be structured such as data records or XML files. Relational database management systems (RDBMS), such as Oracle, Sybase, DB2, SQL Server, and Informix, provide a mechanism for storing, searching, and retrieving structured data. For example, an RDBMS storing a customer list may facilitate searching and receiving customers records by fields such as name, company, or address. When fields are often used in data queries, the fields may be indexed in an RDBMS system to reduce the time needed to satisfy those queries. Indexing may reduce search times from linear time (e.g., searching each record for possible matches) to logarithmic time (e.g., using a tree-based indexing scheme) or to constant time (e.g., using a hash-based indexing scheme).

Freeform text search systems are sometimes implemented by creating structured data representing a freeform record. Then, structured data techniques may be applied to the freeform records. For example, a list of words in a web page may be used to create structured data linking the words to the web page. The structured data may be indexed and stored such that a user may perform queries to identify web pages containing a particular word.

In RDBMS systems, data records are typically organized into tables. Each table includes one or more data records and each data record includes one or more fields. For example, a customer table may include a data record for each customer with each data record including fields such as the following: customer number, first name, last name, address, and telephone number. The performance of an RDBMS system may be improved by indexing fields that are often used in queries. For example, if users often search for customer numbers and last names, those fields may be indexed to reduce the time it takes to satisfy such queries. For example, a B-tree index may be used to reduce the search time from linear time to logarithmic time. In a conventional data query system, the indexes typically are created and stored apart from the data that is indexed.

Figure 1:
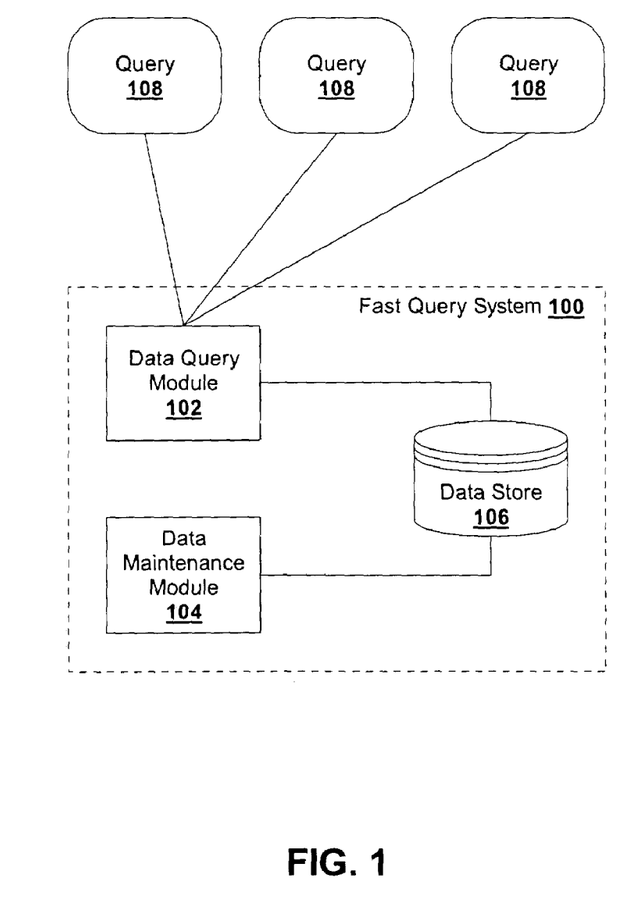
FIG. 1 is a block diagram of a data query system.

Referring to FIG. 1, a fast query system 100 includes a data query module 102, a data maintenance module 104, and a data store 106. The data query module 102 receives and processes queries 108. Data queries may be formulated in a proprietary query language, or in a standard query language such as the structured query language (SQL). The data maintenance module 104 may perform maintenance tasks such as data loads, backups, indexing, and optimization. The data maintenance module 104 may be used to load data from, for example, a flat file or RDBMS into the fast query system 100. Loaded data is stored in the data store 106 in a format to facilitate fast responses to queries as is described below with respect to FIGS. 2, 3, and 4A-4D.

In one implementation, the fast query system 100 receives a query 108 formulated in the SQL query language. The data query module 102 processes the query and returns data records from the data store 106 satisfying the query 108. For example, a business application may select all customer records corresponding to customers with a last name of "Smith" by sending the following query 108 to the fast query system 100:

SELECT*FROM Customer WHERE
    Name="Smith".

Figure 2:
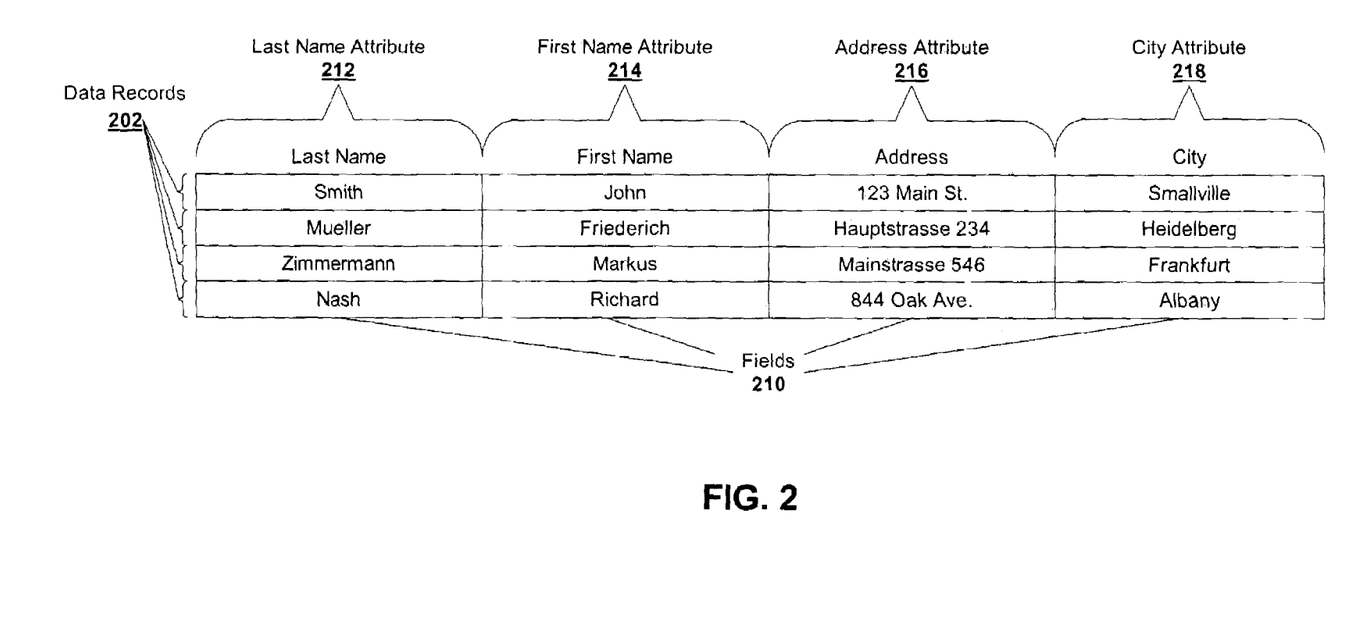
FIG. 2 is a diagram of a series of data records and their corresponding fields.

Referring to FIG. 2, the data store 106 maintains data in data structures to facilitate efficient search and retrieval. In a conventional RDBMS system, data is organized into tables with each table including data records 202 having one or more fields 210. In this example, each data record 202 includes a last name attribute 212, a first name attribute 214, an address attribute 216, and a city attribute 218. This data is maintained in the data store 106 in a tree structure. Each attribute is indexed to facilitate searching on a particular field 210 and each data record 202 is stored to facilitate retrieval of other fields 210 within a given data record 202.

Figure 3:
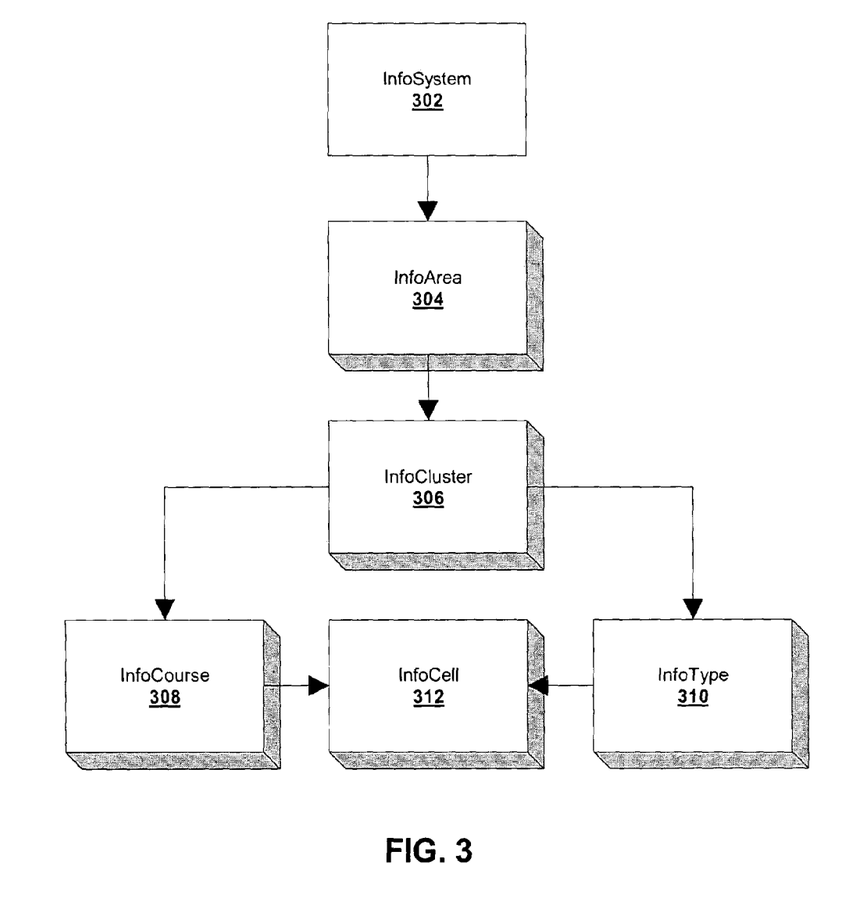
FIG. 3 is a block diagram of various data abstractions used in a fast query system to represent attributes and data records.
Figure 4A:
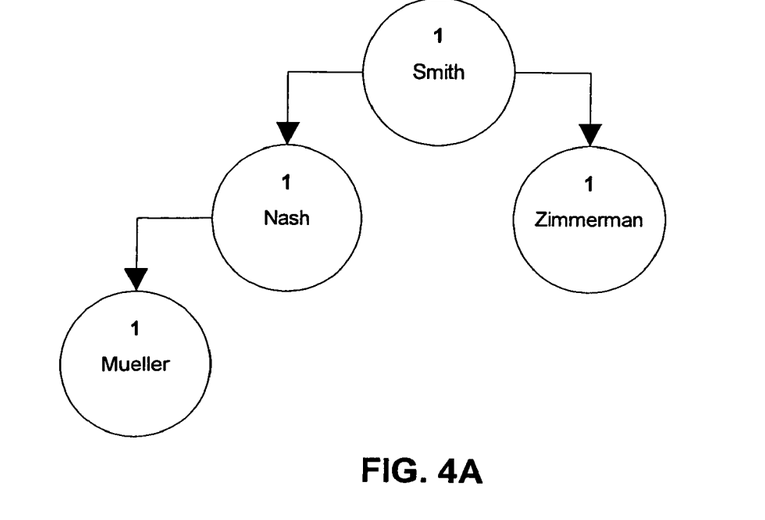
FIGS. 4A-4D are diagrams of InfoType tree structures indexing attributes within a fast query system.
Figure 4B:
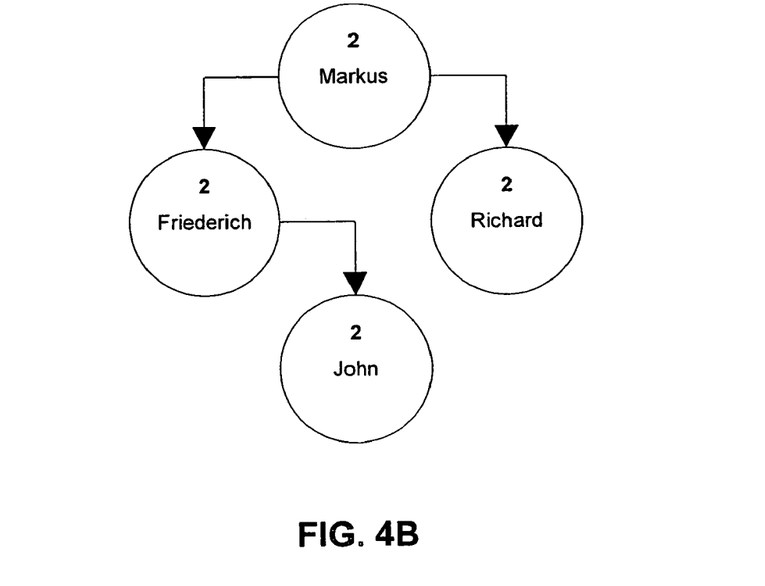
Figure 4C:
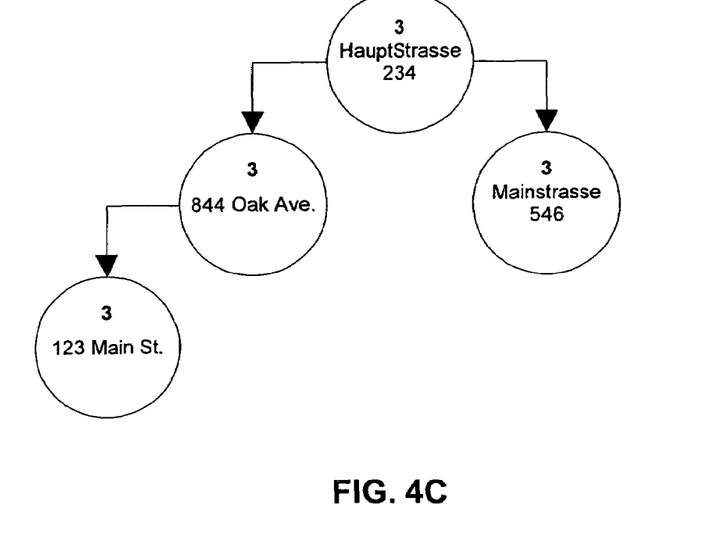
Figure 4D:
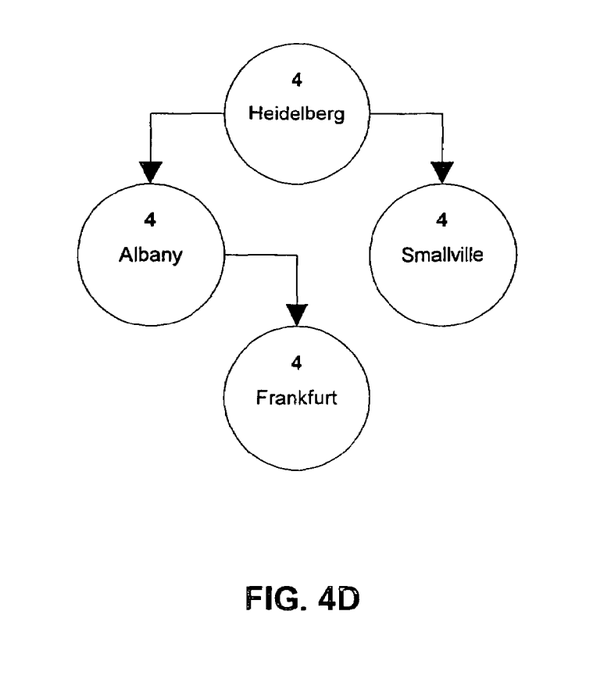

Referring to FIG. 3, in some implementations, the fast query system 100 is organized using the following abstractions. All data stored in a fast query system 100 is stored within an InfoSystem 302. The InfoSystem 302 roughly corresponds to an RDBMS system in a relational database model. Each InfoSystem 302 includes one or more InfoAreas 304. Each InfoArea 304 is roughly equivalent to a database in an RDBMS system. An InfoArea 304 includes one or more InfoClusters 306 which are similar to tables within an RDBMS system. An InfoCluster 306 includes one or more InfoCourses 308 and one or more InfoTypes 310 with InfoCourses 308 representing data records and InfoTypes 310 representing attributes within an InfoCluster 306. An individual field 210 in a data record 202 is represented by an InfoCell 312. Each InfoCell 312 appears in at least one InfoType 310 representing the data record 202 of the field 210 and at least one InfoCourse 308 representing an attribute corresponding to the data records 202.

In implementations having a single database, the InfoSystem 302 and InfoArea 304 are not necessary. In such systems, the InfoCluster 306 may serve as the highest-level abstraction within a fast query system 100.

Referring to FIGS. 4A-4D, InfoTypes 310 and InfoCourses 308 may be implemented using any indexing structure including tree structures or hash tables. For example, conventional balanced tree structures such as red-black trees and AVL trees may be used. FIGS. 4A-4D illustrate InfoTypes 310 using balanced binary trees used in an AVL index. In this example, each node within the InfoType 310 includes a left and right pointer. A node's left pointer identifies elements less than the node and a node's right pointer identifies elements greater than the node. For example, "Nash" is less than "Smith" and "Zimmerman" is greater than "Smith." The numbers on each node in FIGS. 4A-4D represent the node's InfoType 310. The number "1" represents the last name attribute 212, "2" represents the first name attribute 214, "3" represents the address attribute 216, and "4" represents the city attribute 218. Each attribute is represented by a corresponding InfoType 310.

Figure 5A:
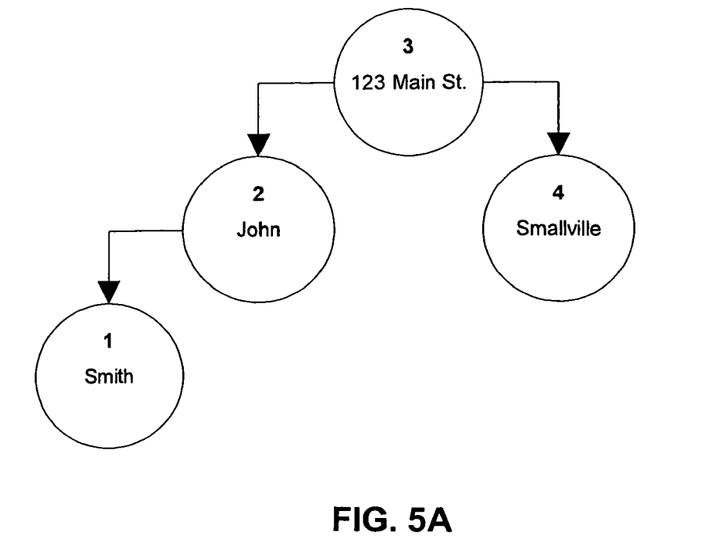
FIGS. 5A-5D are diagrams of InfoCourse tree structures indexing data records within a fast query system.
Figure 5B:
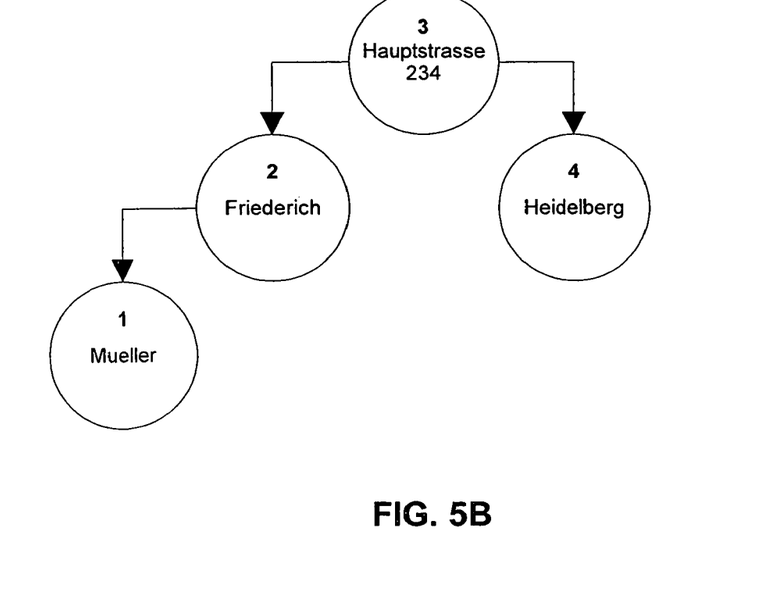
Figure 5C:
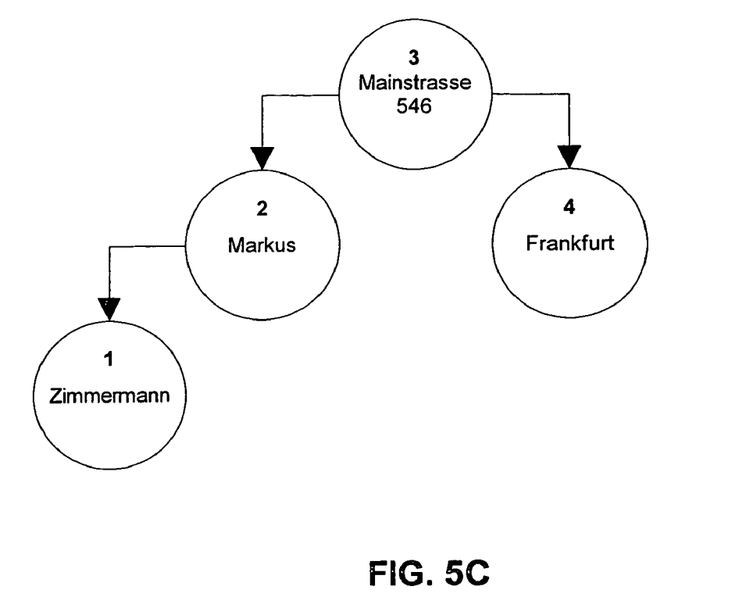
Figure 5D:
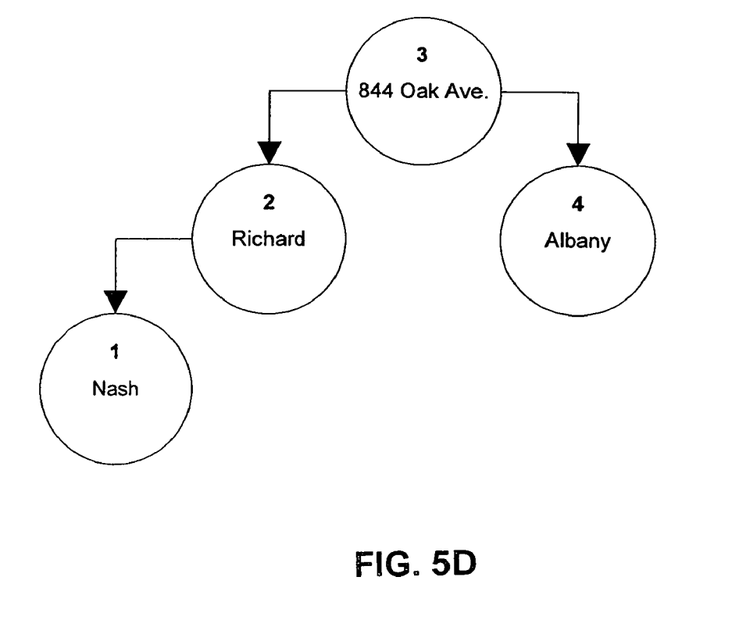

Referring to FIGS. 5A-5D, InfoCourses 308 represent data records 202 in a data query system 100. The fields 210 within a data record 202 may be indexed to facilitate retrieval of a specific field 210. For example, FIGS. 5A-5D show four AVL trees indexing fields 210 in an InfoCourse 308. Each field 210 is represented by an InfoCell 312. Alternatively, any other indexing technique may be used including, but not limited to, red-black trees, B-trees, or hash tables. In this example, an arbitrary number corresponding to an InfoType 310 is used to index the data record 202 within an InfoCourse 308. In FIG. 5A, the root node, numbered "3," stores the address attribute 216, "123 Main St." To its right is the city attribute 218, "Smallville," because its corresponding number "4" is greater than "3." To its left is the first name attribute 214, "John," with a corresponding number "2" less than "3." Finally, the last name attribute 212, "Smith," with a corresponding number "1" is to the left of the first name attribute 214.

Figure 6:
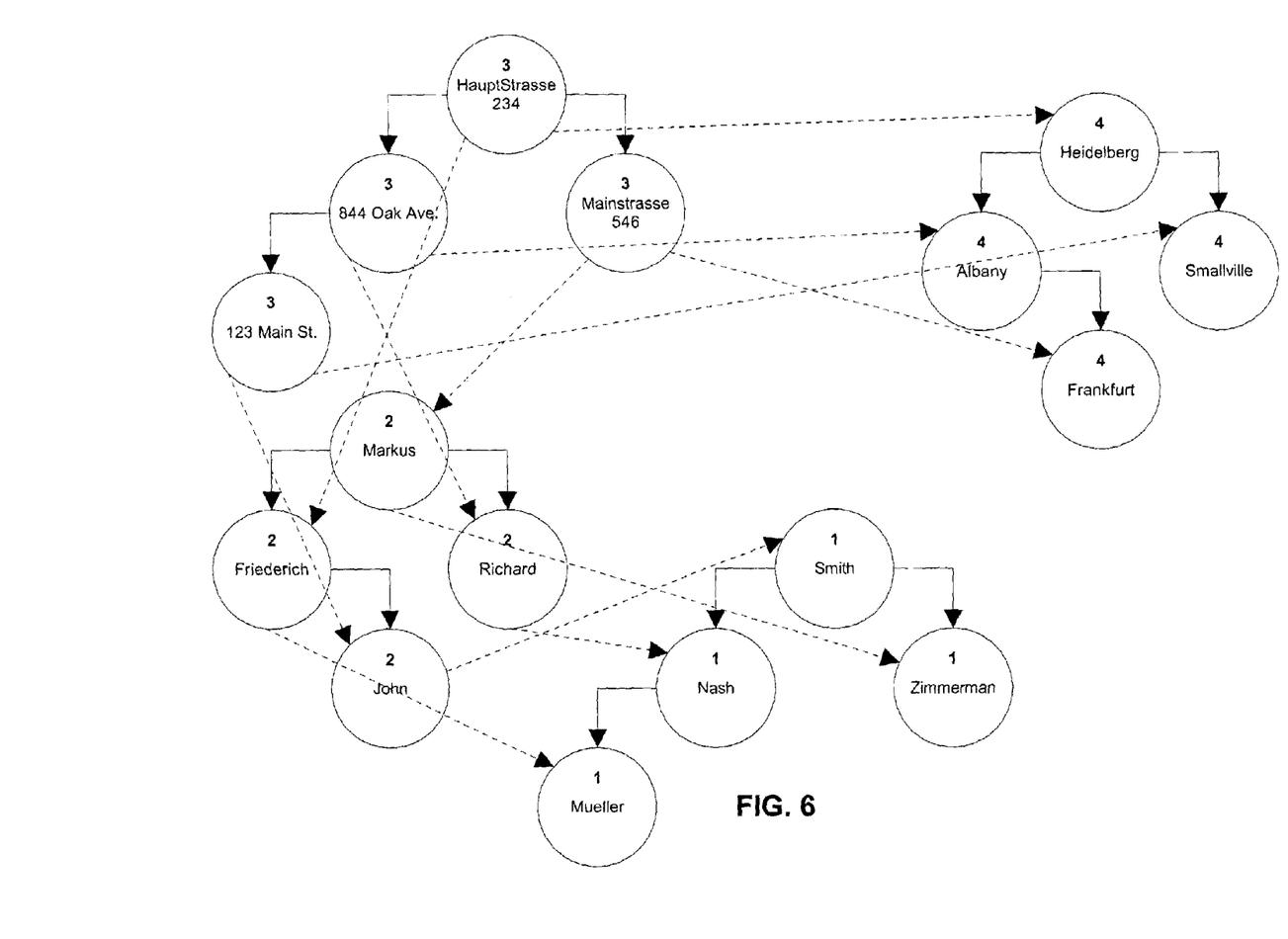
FIG. 6 is a diagram showing the relationships between InfoTypes and InfoCourses.

Referring to FIG. 6, the InfoCourse 308 and InfoType 310 data structures are integrated with one another to form an InfoCluster 306. Each node within the InfoType 310 and InfoCourse 308 data structures is represented by an InfoCell 312. This allows the system to traverse an InfoType 310 to quickly find data records 202 that satisfy a query and to traverse an InfoType 308 for a particular data record 202 to locate a desired field 210.

Figure 7:
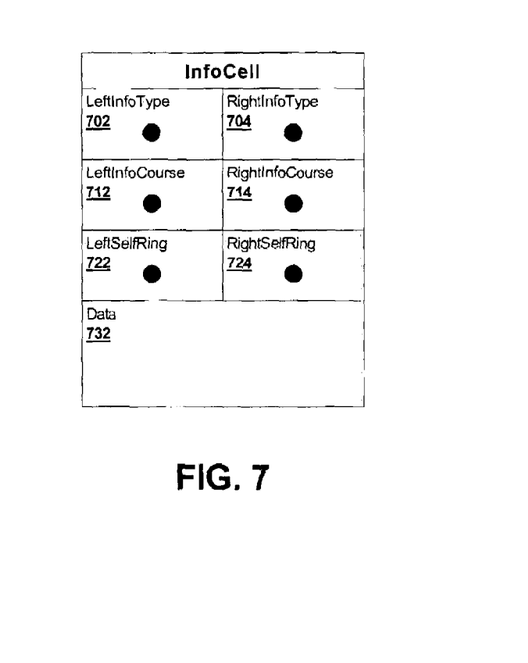
FIG. 7 is a diagram of an InfoCell data structure.

FIG. 7 shows an exemplary Info Cell 312 data structure that may be used by InfoCourses 308 and InfoTypes 310. The InfoCell 312 includes a left InfoType pointer 702 and a right InfoType pointer 704. These pointers are used to define an InfoType 310 tree structure. For example, in FIG. 4A the InfoCell 312 for the last name attribute 212 "Smith" includes a left InfoType pointer 702 to the "Nash" InfoCell 312 and a right InfoType pointer 704 to the "Zimmerman" InfoCell 312. Some InfoCell 312 data structures do not need a left InfoType pointer 702 or a right InfoType pointer 704. Blank InfoType pointers 702 or 704 may point to the null value or may reference an anchor node of the InfoType 310. An anchor node points to the root node of the InfoType 310 so the system may begin a tree traversal or so that the system may identify when the bottom of the tree has been reached. Additionally, the root node of the tree may be located by traversing the tree until the anchor node is reached. Similarly, a left InfoCourse pointer 712 and a right InfoCourse pointer 714 are used to define an InfoCourse 308 tree structure. Each InfoCourse 308 also may include an anchor node.

If more than one InfoCell 312 in an InfoType 310 are equivalent, then the equivalent InfoCells 312 are not less than or greater than each other and so may be represented in the same location in the InfoType 310 data structure. A left self ring pointer 722 and a right self ring pointer 724 may be used to represent each equivalent InfoCell 312 in an InfoType 310 as a ring with InfoCell 312 in the InfoType 310 tree and the equivalents being linked to one another using the left self ring pointer 722 and right self ring pointer 724. Finally, data in an InfoCell 312 is stored in the data field 732.

This fast query application maintains an InfoCell 312 for each attribute value in each data record. To provide fast query functionality for a data store having 5.3 million records and each record having 10 attributes, this implementation of a fast query system stores 53 million InfoCell 312 data structures. The following application level memory management techniques provide efficient access to each of the 53 million data records.

Figure 8:
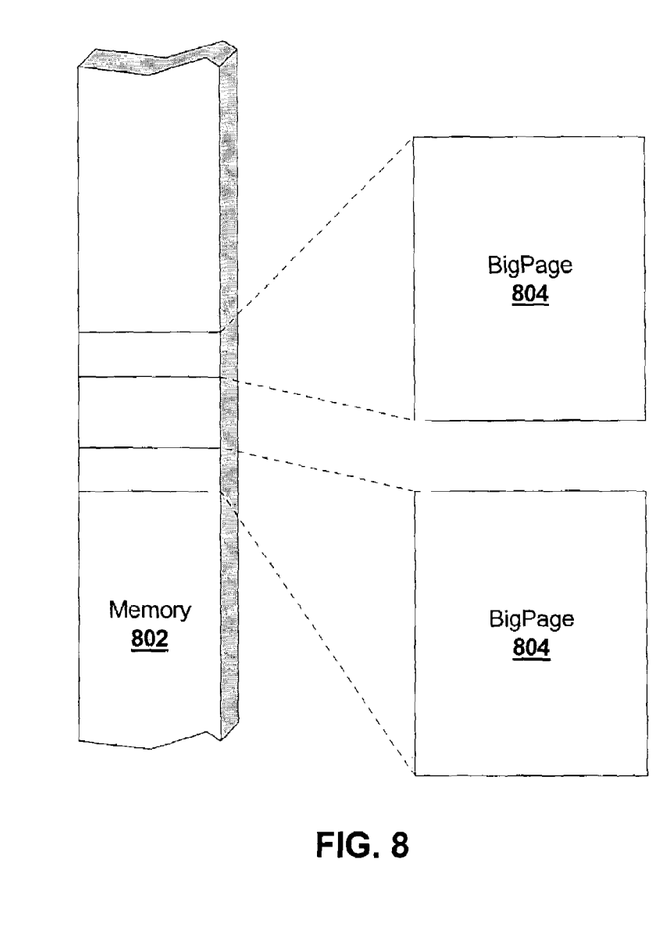
FIG. 8 is a block diagram of memory under control of a memory management system with two BigPages allocated.

Referring to FIG. 8, memory 802, managed by an operating system, is divided into one or more blocks called BigPages 804. Instead of applications allocating individual blocks of memory for each data object, applications may allocate BigPages 804 from the operating system and store multiple data objects on each BigPage 804, thus reducing the total number of data objects that must be allocated and maintained by the operating system. A BigPage 804 may be allocated in any size and then subdivided into frames for holding instances of data objects. For example, in a fast query system, 16 MB BigPages 804 may be used such that 64 BigPages 804 are needed to allocate 1 GB of storage space. In this implementation, BigPages 804 are allocated from the operating system and the allocated BigPages 804 are used to store individual frames and instances so that individual frames and instances do not need to be individually allocated and managed by the operating system.

In some implementations, it may be desirable to use a smaller BigPage 804, a larger BigPage 804, or to use variable-size BigPages 804. As described below, some applications may improve memory management performance by only storing a single data type in a BigPage 804. If a large number of data types are used, with less than 16 MB storage required for each data type, it may be beneficial to use a smaller BigPage 804 size, such as, for example, 1 MB, 2 MB, 4 MB, or 8 MB. Similarly, some applications may benefit from a larger BigPage 804 size, such as, for example, 32 MB, 64 MB, or 1 GB. Finally, variable-sized BigPages 804 may be used to optimize memory management for a particular application.

In some implementations, the size of BigPages 804 is set in software by a coding parameter. Unless an application changes this coding parameter, BigPages 804 are allocated using a default size. If larger or smaller sizes are desired, the system may change the coding parameter to specify a new size.

Figure 9:
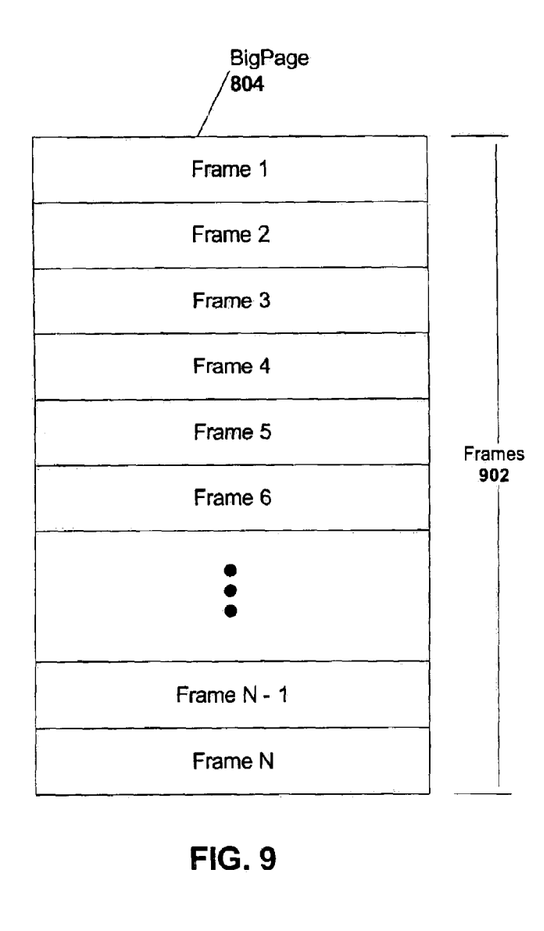
FIG. 9 is a block diagram of a BigPage divided into frames for storing multiple small data objects.

Referring to FIG. 9, a BigPage 804 is divided into various frames 902, which are used to store individual data elements. In this implementation, a BigPage 804 is divided into N frames 902. Operating systems implementing virtual memory divide memory into pages of a predetermined size that may be paged in or paged out of main memory. So that an entire frame will be either paged in or paged out at the same time, frames may be arranged to coincide with pages in the underlying operating system and hardware platform. For example, in an operating system using 4 kilobyte (KB) pages, each BigPage 804 may be divided into 4 KB frames 902 such that frames may be paged in and paged out as a whole by the underlying operating system.

In one implementation, a 16 MB BigPage 804 is used in a computer system with a 8 KB page size. The BigPage 804 may be divided into 8 KB frames 902 to create 2,048 frames 902. These frames, in turn, may be used to store data. Similarly to BigPage 804 sizes, frames 902 may be sized using a coding parameter to allow applications to adjust the size of a frame 902 based on a particular application. Typically, the size of a frame 902 is chosen such that there are a relatively large number of frames in each BigPage 804; however, any size frames may be used.

Figure 10:
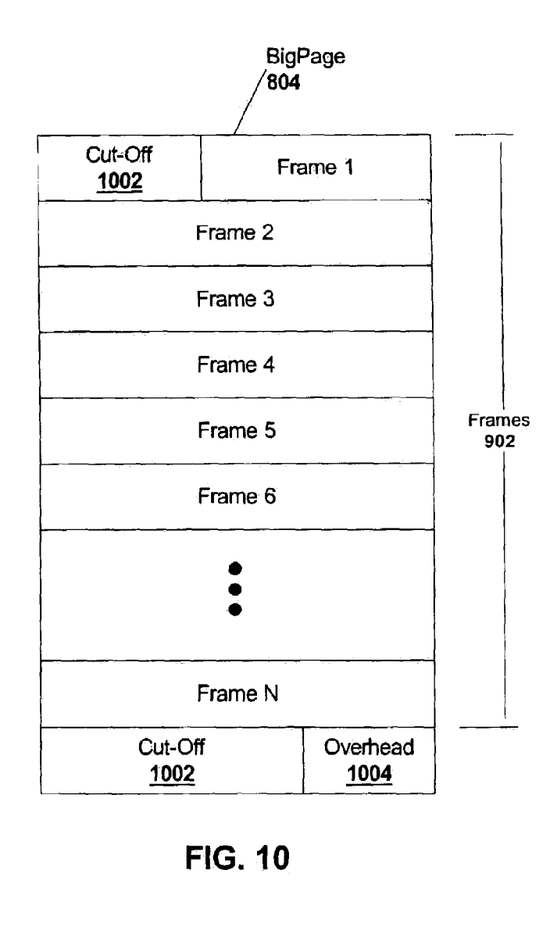
FIG. 10 is a block diagram of a BigPage with cut-off at the beginning and end so that frames do not cross page boundaries.

Referring to FIG. 10, frames 902 may be sized such that they are the same size as pages used by the underlying operating system as discussed above with reference to FIG. 9. In some operating systems, a BigPage 804 may be allocated such that it begins on a page boundary. If the BigPage 804 begins on a page boundary and each frame 902 is the same size as a page, then each frame 902 will coincide with a frame such that the frame 902 is either paged in or paged out.

Some operating systems do not provide the capability to allocate a block of memory beginning on a page boundary. To improve these memory management techniques in these operating systems, the application-level memory management system may begin the first frame 902 at the beginning of the first memory page entirely within the BigPage 804, leaving a portion of the BigPage 804 unused. This unused memory, designated cut-off 1002, is less than the size of a single frame 902.

In addition to the cut-off 1002 at the beginning of a BigPage 804, there may be memory left at the end of the BigPage 804 that is too small for a frame 902. This space also may be designated as cut-off 1002. If the BigPage 804 is chosen to be a multiple of the size of each frame 902, then the BigPage 804 may be divided into N frames, where N is the size of the BigPage 804 divided by the size of the frame 902, if the BigPage 804 begins on a memory page boundary. If the BigPage 804 begins outside of a memory page boundary, the system designates a cut-off 1002 at the beginning and the end of the BigPage 804. The cut-off 1002 at the beginning and end of the BigPage 804 would form an additional frame 902 if combined together, thus only (N-1) frames 902 are available.

In some operating systems, additional data storage is needed to store various administrative data. This allocator memory overhead 1004 may be appended onto the end of the BigPage 804 or it may be stored within the BigPage 804, in memory that would otherwise be designated as cut-off 1002. FIG. 10 shows an implementation with the overhead 1004 included within the BigPage 804.

The cut-off 1002 at the beginning and end of a BigPage 804 resides outside of memory pages storing data. Thus, the pages containing the cut-off 1002 (and the overhead 1004) will eventually be paged out so that they do not take up physical memory that could adversely impact overall system performance.

Figure 11:
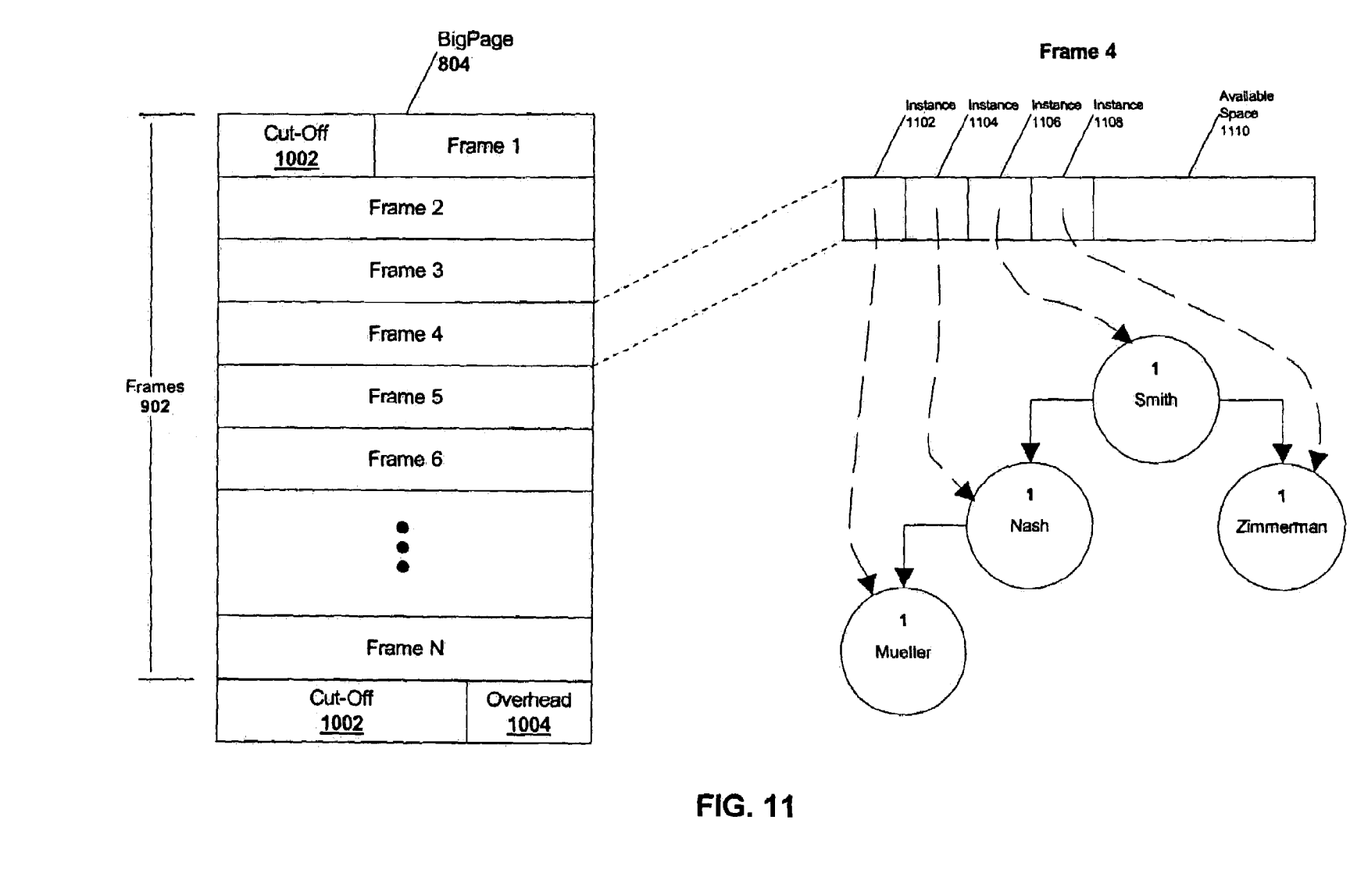
FIG. 11 is a block diagram of various data objects stored in a frame.

Referring to FIG. 11, each frame 902 may be further divided to store instances (1102, 1104, 1106, and 1108) of a particular data type. In this example, an InfoType 310, from the example discussed with reference to FIGS. 4A-4D, is an AVL tree storing an attribute from a group of data records. Each node in the AVL tree is an instance of an InfoCell 312 (as shown in FIG. 7). These InfoCells 312 are stored in portions of a frame 902 within a BigPage 804.

In this example, an InfoCell 312 representing an attribute of a data record having the value "Mueller" is stored in instance 1102 of frame 4, an attribute having the value "Nash" is stored in instance 1104, an attribute having the value "Smith" is stored in instance 1106, and an attribute having the value "Zimmerman" is stored in instance 1108. Because each of these instances is stored within a BigPage 804, it is unnecessary to consume overhead 1004 for each of the objects. Additional data may be stored in the remaining available space 1110.

In some implementations, only instances of a single type, such as for example, instances of the same data type or same class, are stored in a single BigPage 804. This simplifies the administration of a BigPage 804 since each instance in each frame 902 is the same size. Additionally, instances 1102, 1104, 1106, and 1108 make up a single AVL tree used by the fast query system 100 of FIG. 1. When the fast query system 100 traverses the tree to satisfy a query, the nodes within the tree are likely to be used in close temporal proximity. By storing nodes of a single type on one BigPage 804 or a few BigPages 804, the system may be able to maintain spatial proximity of the data. This design may reduce the system page rate if physical memory is insufficient and the operating system begins to page out memory.

Additionally, by only using instances of a single type within a BigPage 804, resources may be more easily returned to the operating system for later use or for use by another application when all instances of a single type are deleted. However, if a BigPage 804 contains many instances of one type and a single instance of another type, the BigPage 804 may not be returned to the operating system when the many instances of the first type are deleted—the system must wait until the single instance is no longer needed before reclaiming the BigPage 804.

Without using these techniques, an application may store an instance by allocating storage space for that instance and storing the instance in the allocated space. This results in unnecessary overhead in identifying the type of the instance and other administrative information. Alternatively, using the techniques described above, the application may store an instance by determining if space is available in a frame 902 of a BigPage 804 for storing the corresponding type of data. If space is available, the system stores the instance. If space is not available, the system may allocate another BigPage 804 from the operating system and store the instance in one of its fields.

Figure 12:
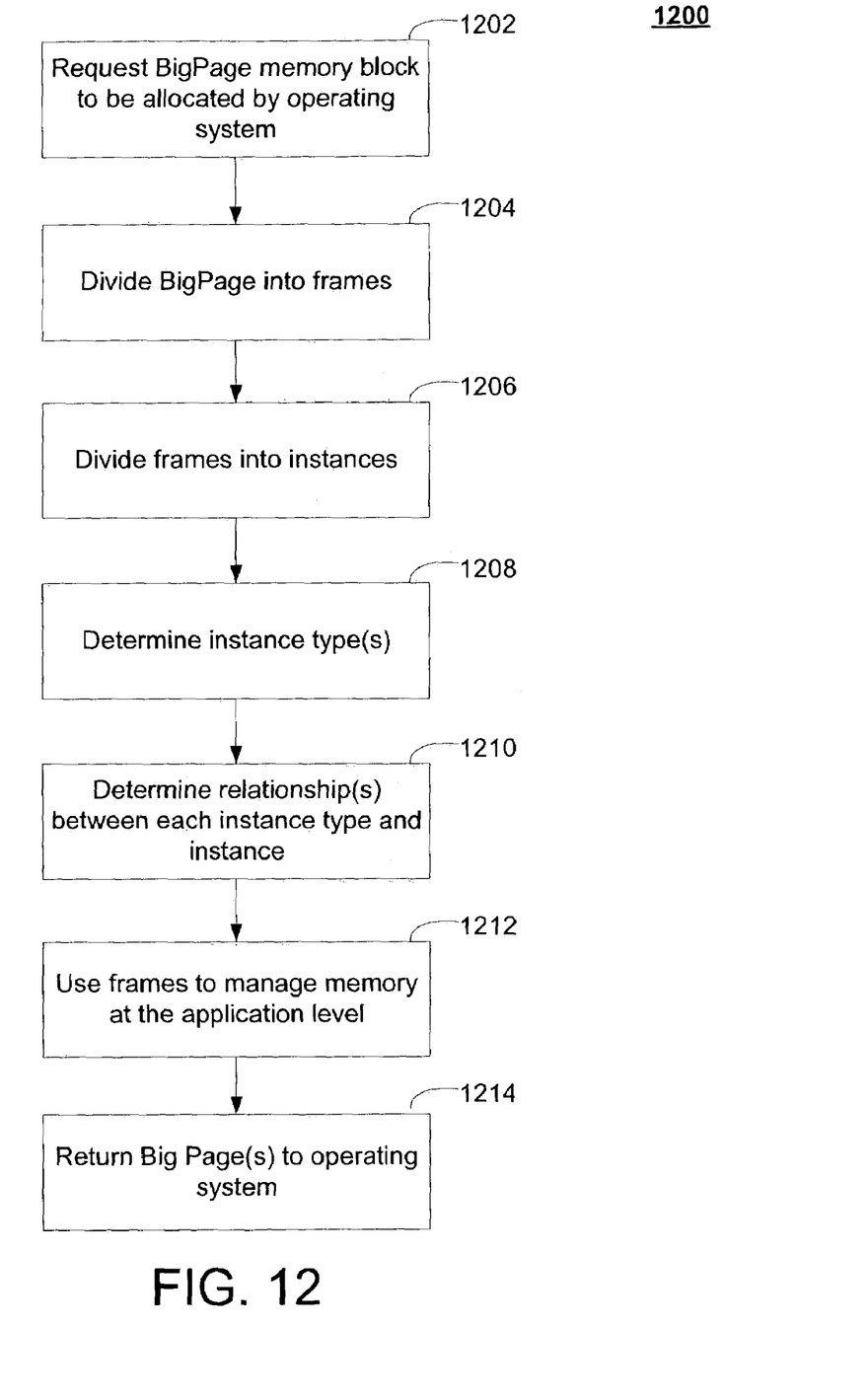
FIG. 12 is a flow chart illustrating allocation and use of a BigPage.

FIG. 12 is a flow chart 1200 illustrating allocation and use of a BigPage. In FIG. 12, an application such as the fast query system 100 requests allocation of a BigPage memory block from its operating system (1202). As discussed above, this allocation relieves the operating system of the burden of managing many in stances/objects individually by only requiring that the operating system be responsible for managing the relatively smaller number of BigPages.

Next, the application divides the BigPage(s) into individual frames (1204), and divides the individual frames into instances (1206). The application may then determine instance types (1208), or, more generally, the application may have already determined various instance types at some previous point in time. For example, in the example of FIG. 11, the fast query system 100 determines (or has determined) an InfoType making up a specific AVL tree in which last names of customers are stored.

Based on the above, the application is able to determine a relationship between each instance type(s) and the various instances of the frames (1210). That is, it should be understood that it is generally the application, not the operating system, which has specific knowledge as to how instance types are defined, organized, and/or related to other instance types. Further, as in the examples discussed above, the application has knowledge as to which instances are temporally or spatially related to one another. Therefore, the application is well-suited to ensure that, generally speaking, instance types are optimally organized for storage in (and removal from) selected instances of selected frames.

The application proceeds to use the frames to manage memory during execution of the application (1212). For example, the fast query system 100 may use data from the frames to access customer data and respond to queries about those customers. Since the application is able to define and store related data in related instances (i.e., instances of a particular frame or BigPage), access to the customer data from the frames is facilitated.

When the fast query system 100 or other application is finished responding to queries regarding the customer database, it may return the BigPage(s) to the operating system (1214). Specifically, to the extent that the application has only stored related data in the frames, e.g., data of a single instance type, it is likely that an application may relinquish data from an entire BigPage at once, so that the BigPage may be returned to the operating system quickly and efficiently. That is, a scenario in which an application cannot return any of an entire BigPage, merely because a small portion thereof is required to store a single instance type, is avoided.

In returning the BigPage(s) to the operating system (1214), it should be understood that the application need not return a BigPage immediately upon a determination that it is no longer needed. For example, the application may retain access to a pool or buffer of BigPages for some predetermined period of time before actually releasing them to the operating system. In this way, particularly when a relatively large number of BigPages being used is in flux, the processes of allocating BigPages from (and returning BigPages to) the operating system may be minimized, since the application may be able merely to access the buffer for BigPages, as needed.

A frame handler, such as that described in U.S. application Ser. No. 10/625,897 titled "MEMORY MANAGEMENT FRAME HANDLER" may be used with the system and techniques described herein. Alternatively, many techniques for identifying free storage space, reclaiming unused space, and locating data stored within a BigPage 804 will be apparent to one skilled in the art.

A number of implementations have been described. Nevertheless, it will be understood that various modifications may be made. Accordingly, other implementations are within the scope of the following claims.

What is claimed is:

1. A method for allocating memory in a computer system, the method comprising:
    determining a size of a memory page used by a page virtual memory system;
    outputting a request from an application to the paged virtual memory system for allocation of a block of memory by an operating system to the application, the block of memory being integer N times the size of the memory page, the integer N being greater than one;
    accessing the block of memory for the application;
    dividing the block of memory into (N-1) frames, with each of the frames operable to store an indexing structure associated with an attribute of a data record, and each frame being the same size as the memory page used by the operating system;
    determining a beginning page boundary of a first whole memory page within the block of memory;
    storing the frames beginning at the beginning page boundary;
    dividing each of the frames into a plurality of instances, with each of the plurality of instances operable to store an index node of the indexing structure, the index node including left and right pointers pointing to other index nodes of the index structure having the same attribute as the index node;
    storing administrative data in a cut-off portion of the block of memory disposed in front of the beginning page boundary or behind the (N-1)th frame; and
    associating the attribute with the plurality of instances for data storage using the plurality of instances.

2. The method of claim 1 wherein the size of the block of memory is determined by a coding parameter associated with the application.

3. The method of claim 1 wherein storing administrative data includes storing administrative data in the cut-off portion disposed behind the (N-1)th frame and the method further comprises designating the cut-off portion in the front of beginning page as unused.

4. The method of claim 1 wherein a size of each of the frames is determined by a coding parameter.

5. The method of claim 1 wherein a sire of each of the frames is determined by a page size used by the operating system.

6. The method of claim 1 wherein storing administrative data includes storing administrative data in the cut-off portion disposed in front of the beginning page boundary and the method further comprises designating the cut-off portion disposed behind the (N-1)th frames unused.

7. The method of claim 1 wherein a single type of data is stored in the block of memory.

8. The method of claim 1 wherein data from a fast query system is stored in the instances.

9. The method of claim 1 further comprising populating the plurality of instances with the data elements.

10. The method of claim 9 further comprising:
    removing the data elements; and
    returning the block of memory to the operating system.

11. The method of claim 10 wherein returning the block of memory to the operating system composes:
    returning the block of memory to a buffer; and
    determining after a pre-determined period of time that the block of memory is no longer required by the application.

12. A software application tangibly embodied on a computer-readable medium using application-level memory management, the software application comprising:

an application-level memory manager operable to:
  determine a size of a memory page used by a paged virtual memory system,
  request from the paged virtual memory system to allocate a block of memory to store data elements, the block of memory being integer N times the size of the memory page, the integer N being greater than one,
  divide the block of memory into (N-1) frames, with each of the frames operable to store an indexing structure associated with an attribute of a data record, and each of the frames being the same size as the memory page used by an operating system,
  determine a beginning page boundary of a first whole memory page within the block of memory,
  store the frames beginning at the beginning page boundary,
  divide each frame into a plurality of instances, with each of the plurality of instances operable to store an index node of the indexing structure, the index node including left and right pointers pointing to other index nodes of the index structure having the same attribute as the index node, and
  store administrative data in a cut-off portion of the block of memory disposed in front of the beginning page boundary or behind the (N-1)th frame; and
application code operable to associate the attribute with the plurality of instances for storage of the data elements in the plurality of instances.

13. The software application of claim 12 wherein the size of the block of memory is determined by a coding parameter.

14. The software application of claim 12 wherein to store administrative data the application-level memory manager is operable to store administrative data in the cut-off portion disposed behind the (N-1)th frame and the application-level memory manager is further operable to designate the cut-off portion in the front of the beginning page as unused.

15. The software application of claim 12 wherein a size of each of the frames is determined by a coding parameter.

16. The software application of claim 12 wherein a size of each of the frames s determined by the page size used by the operating system.

17. The software application of claim 12 wherein to store administrative data the application-level memory manager is operable to store administrative data in the cut-off portion disposed in front of the beginning page boundary and the application-level memory manager is further operable to designate the cut-off portion disposed behind the (N-1)th frame as unused.

18. The software application of claim 12 wherein a single type of data is stored in the block of memory.

19. The software application of claim 12 wherein the application code implements a fast query system.

* * * * *